(12) United States Patent
Cai

(10) Patent No.: US 8,172,378 B2
(45) Date of Patent: May 8, 2012

(54) CARBON BLACK PIGMENTED INKJET INK HAVING MULTIPLE HUMECTANTS

(75) Inventor: Xiaorong Cai, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 308 days.

(21) Appl. No.: 12/437,631

(22) Filed: May 8, 2009

(65) Prior Publication Data

US 2010/0285219 A1  Nov. 11, 2010

(51) Int. Cl.
*B41J 2/175* (2006.01)
*B05D 5/00* (2006.01)

(52) U.S. Cl. ............................ 347/85; 347/100; 427/256
(58) Field of Classification Search .................... 427/256
See application file for complete search history.

(56) References Cited

U.S. PATENT DOCUMENTS

| 2005/0187312 A1* | 8/2005 | Akers et al. .................... 523/160 |
| 2007/0043144 A1* | 2/2007 | House et al. ................... 523/160 |

* cited by examiner

*Primary Examiner* — Robert Loewe

(57) ABSTRACT

The present invention relates to a carbon black inkjet ink having improved printhead idle time and start up in order to substantially maintain, un-interrupted printing with better nozzle jetting. The inkjet ink includes a non-ionic silicone surfactant, a polymeric dispersant, and two or more humectants.

12 Claims, 1 Drawing Sheet

CARBON BLACK PIGMENTED INKJET INK HAVING MULTIPLE HUMECTANTS

CROSS REFERENCE TO RELATED APPLICATIONS

Not applicable.

MICROFICHE APPENDIX

Not applicable.

GOVERNMENT RIGHTS IN PATENT

Not applicable.

BACKGROUND OF THE INVENTION

1. Field of the Invention

The present invention relates to inkjet inks, and, more particularly, to a carbon black ink for thermal inkjet printing having improved jetting.

2. Description of the Related Art

Thermal inkjet printing, to which this invention relates, is a commonly practiced form of printing. Thermal ink jet printing involves intense heating of an aqueous ink in a small amount in contact with a heating element so the ink is vaporized. The vaporized ink, including solids in the ink, is then expelled through a nozzle and subsequently jetted to an intended substrate, such as, for example, paper.

The composition of an inkjet ink is traditionally comprised of deionized water, a water-soluble organic solvent, and a colorant. The colorant may be a soluble dye or insoluble pigment. Pigment based inks may have some disadvantages as compared to dye based inks. For example, due to the insolubility of pigments in water, polymeric dispersants and/or surfactants are typically added to improve the dispersibility of the pigment. The addition of a polymeric dispersant can increase the viscosity of an ink, and a viscous ink may be more difficult to jet in a printhead.

It is believed that the properties of the ink composition in a printhead change as water evaporates from the ink adjacent the nozzles of the printhead. Ink formulations having a pigment as a colorant typically also include dispersants and organic components such as humectants, binders, penetrants, organic solvent and the like. As water evaporates from the ink, the percentage of organic components in the ink formulation increases so that the ink becomes less hydrophilic. As the ink becomes less hydrophilic, the dispersed pigment, which is strongly hydrophilic, is pulled back into the bulk aqueous phase, idle time is used to measure this short-term reliability of the ink. "Idle time" means the time between nozzle firings just before the printhead produces delayed or misdirected ink droplets. Typically, pigments, such as carbon black, exhibit poor idle times in inkjet printers.

What is needed in the art is an inkjet ink having a carbon black pigment dispersion that has improved printhead idle time and start up in order to substantially maintain un-interrupted printing with better nozzle jetting.

SUMMARY OF THE INVENTION

Exemplary embodiments of the present invention provide an inkjet ink comprised of a carbon black pigment dispersion; a non-ionic silicone surfactant being about 0.1% to about 1.2% by weight of the inkjet ink; a polymeric dispersant being about 0.5% to about 1.5% by weight of the inkjet ink; and two or more humectants selected from the group consisting of 1,2-hexanediol; 1,3-propanediol; glycerol; and tri-ethylene glycol.

Various other exemplary embodiments of the present invention include a method of printing using an inkjet ink. The method is comprised of the steps of positioning a print medium substantially adjacent to a printer having a print head retaining an inkjet ink; and, wherein the inkjet ink is comprised of jetting the inkjet ink from the print head onto the print medium as directed by the printer. The inkjet ink is comprised of a carbon black pigment dispersion; a non-ionic silicone surfactant being about 0.1% to about 1.2% by weight of the inkjet ink; a polymeric dispersant being about 0.5% to about 1.5% by weight of the inkjet ink; and two or more humectants selected from the group consisting of 1,2-hexanediol; 1,3-propanediol; glycerol; and tri-ethylene glycol.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figures 1, 2:
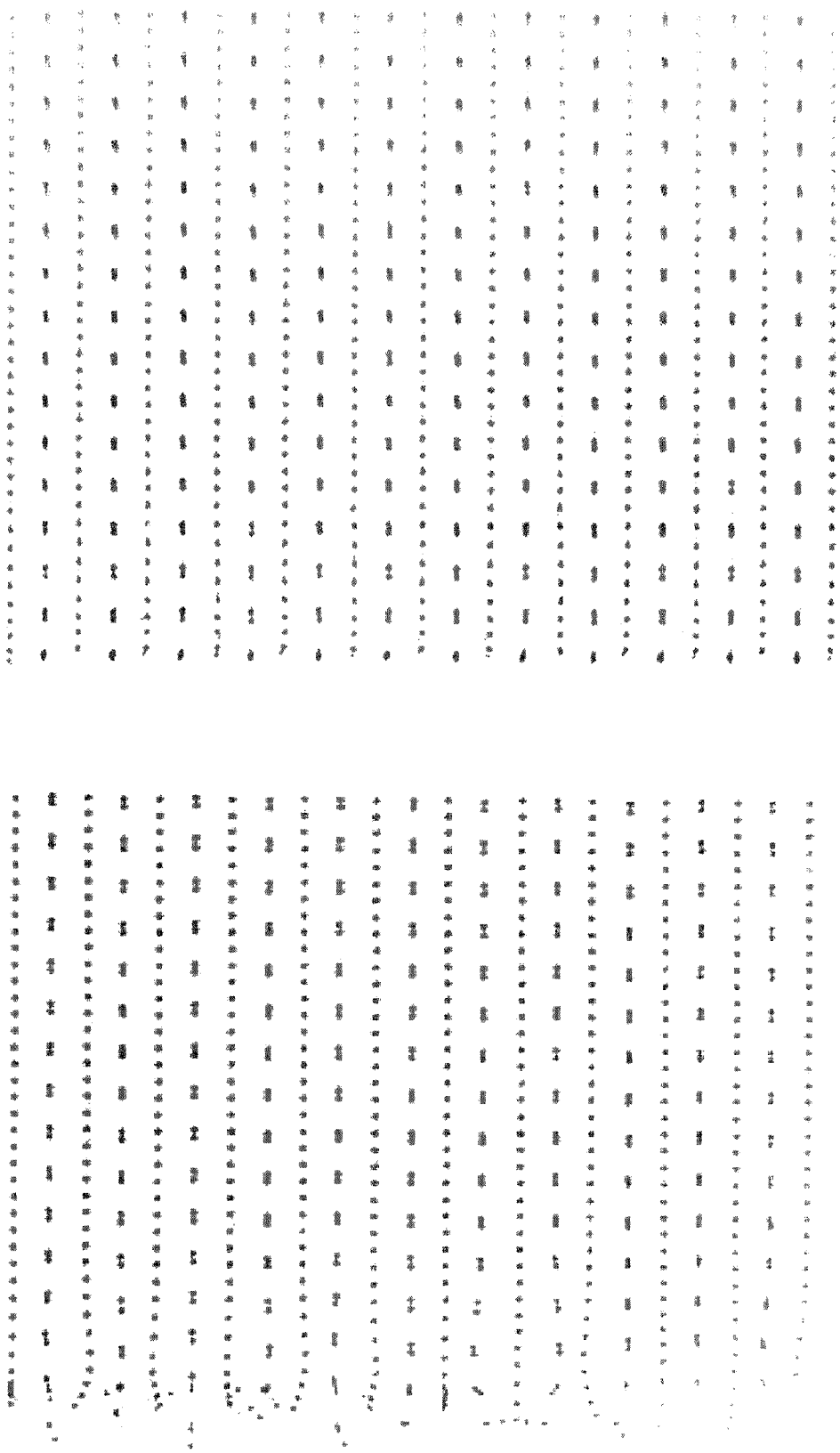
FIG. 1 is a print pattern of a commercially available inkjet ink after zero seconds of idle time.
FIG. 2 is print pattern of an exemplary inkjet ink according to the present invention after six second of idle time.

The exemplification set out herein illustrates one embodiment of the invention and such exemplification is not to be construed as limiting the scope of the invention in any manner.

DETAILED DESCRIPTION OF THE INVENTION

Carbon black pigmented inks have been known to show poor jetting, especially during printhead idle time and start up. In order to compensate for such undesired jetting ability while attempting to maintain un-interrupted printing, some print heads regularly spit or release small amounts of ink. However, such regular spitting increases the maintenance requirements of printheads and decreases the yield, of ink actually used for printing.

It has been found that a particular set of humectants with carbon black inkjet inks increase the jetting of the ink to improve idle time performance of the printhead.

In various exemplary embodiments of the present invention, the inkjet ink is comprised of a carbon black pigment dispersion, a non-ionic silicone surfactant, a polymeric dispersant, and two or more humectants. In particular, the two or more humectants are selected from the group consisting of 1,2-hexanediol, 1,3-propanediol, glycerol, and tri-ethylene glycol.

In exemplary embodiments, the inkjet ink may further be comprised of a biocide and water.

It is preferred that the non-ionic silicone surfactant be of about 0.5% to about 1.2% by weight of the inkjet ink. In a more preferred embodiment, the non-ionic silicone surfactant is about 0.5% to about 0.8% by weight of the inkjet ink. The non-ionic silicone surfactant assists in wetting, surface activation, and bubble control of the inkjet ink.

In exemplary embodiments, the non-ionic silicone surfactant has a molecular weight of about 4000, and is in the form of a polyalkylene oxide polysiloxane having a dimethyl polysiloxane hydrophobic moiety and one or more hydrophilic polyalkylene side chains. A commercially available non-ionic silicone surfactant is, for example, SILWET® L7600 (polyalkylene oxide grafted polydimethylsiloxane from Witco Corp.).

The polymeric dispersant is preferably about 0.5% to about 1.5% by weight of the inkjet ink, and assists in stabilizing the carbon black pigment and buffering the pH of the inkjet ink.

In various exemplary embodiments, the polymeric dispersant is a ten-polymer or acrylic polymer having moieties of acrylic acid or lower alkyl substituted acrylic acid (MAA), poly(propylene glycol)-4-nonylphenyl ether acrylate (NPH-PPG), and poly(ethylene glycol)2,4,6-tris-(1-phenylethyl) phenyl ether methacrylate (TRISA). In exemplary embodiments, a molar ratio of MAA in the polymeric dispersant is about 15 parts to about 2 parts of a combination of NPHPPG and TRISA, and a molar ratio of TRISA in the polymeric dispersant is about 1 part to about 16 parts of a combination of NPHPPG and MAA.

In exemplary embodiments, the two or more humectants are about 20% to about 21% of the inkjet ink, by weight.

Several exemplary inkjet inks according to the present invention were formulated. Table 1 represents the compositions of each of the exemplary inkjet inks.

TABLE 1

Exemplary inkjet inks according to the present invention
(values are % by weight)

| | Example 1 | Example 2 | Example 3 | Example 4 | Example 5 |
|---|---|---|---|---|---|
| Carbon black dispersion pigment | 3.5 | 3.5 | 3.5 | 3.5 | 3.5 |
| Glycerol | 10.0 | 10.0 | 10.0 | 10.0 | 10.0 |
| Triethylene glycol | 5.0 | 5.0 | 5.0 | 5.0 | 5.0 |
| 1,3-propanediol | 5.0 | 5.0 | 5.0 | 5.0 | 5.0 |
| 1,2-hexanediol | — | — | — | — | 1.0 |
| SILWET ® L7600 | 0.8 | 0.5 | 0.5 | 0.5 | 0.5 |
| Lexmark 1329A dispersant | — | 1.0 | — | — | 1.0 |
| Lexmark 823B dispersant | — | — | 0.5 | — | — |
| Lexmark Ter-polymer | — | — | — | 0.4 | — |
| Biocide | 0.15 | 0.15 | 0.15 | 0.15 | — |
| D.I. Water | balance | balance | balance | balance | balance |

Each of the above examples was evaluated using a standard printhead and compared to a commercially available carbon black pigment inkjet ink. The printing quality of each inkjet ink was evaluated based on idle time and start up performances in an environmentally controlled room at 60° F. and 8% humidity.

In Table 2, the idle time of each ink is compared. The idle time is defined as the number of seconds the printhead has been idle and still can jet the inkjet ink without missing or misdirecting ink dots on the adjacent substrate.

TABLE 2

Inkjet Ink Idle Time

| | Seconds |
|---|---|
| Commercially Available Inkjet Ink | <0 |
| Example 1 Inkjet Ink | 6 |
| Example 2 Inkjet Ink | 6 |
| Example 3 Inkjet Ink | 2 |
| Example 4 Inkjet Ink | 4 |
| Example 5 Inkjet Ink | 6 |

As illustrated with the above results of the idle time evaluation, the example inkjet inks formulated according to the present invention show a vastly and surprisingly improved idle time of the ink as contrasted with the commercially available inkjet ink.

FIG. 1 illustrates the printed pattern of the commercially available inkjet ink after zero seconds of idle time. As shown, the printed pattern is messy and out of line at the start of the printing on the left side of the page. In contrast, FIG. 2 illustrates the printed pattern of the Example 2 inkjet ink after six seconds of idle time. The idle time of Example 2 is at least six times longer than the idle time for the commercially available inkjet ink, but as shown, the print pattern of the Example 2 inkjet ink is substantially well ordered and accurate from the start of the printing on the left side of the page.

In Table 3, the start up performance of the commercially available ink is evaluated with the Example 1 and Example 2 inkjet inks above. The start up performance is based on evaluation of the jetting ability of an uncapped printhead after being unused for twenty-four hours in an environmentally controlled room at 60° F. and 8% humidity. The number of spits required to bring the printhead nozzles back to normal and acceptable functioning was measured. The printhead nozzles are measured at two heights from the substrate.

TABLE 3

Printhead Start Up Performance after 24 hours

| | Spits needed for nozzles to function normally and acceptably | | |
|---|---|---|---|
| Ink | Low Nozzle | High Nozzle | Notes |
| Commercially Available Inkjet Ink | 5075+ | 5525+ | Required wet-wiping the printhead 3 times to recover the nozzles |
| Example 1 Inkjet Ink | 3475 | 2575 | Required wet-wiping the printhead 1 times to recover the nozzles |
| Example 2 Inkjet Ink | 4800 | 3467 | Required wet-wiping the printhead 1 times to recover the nozzles |

As exemplified in the above results, the inkjet inks formulated according to the present invention have superior start up performances as contrasted with the commercially available inkjet ink.

Thus, as can therefore be seen from the above, the present invention provides an inkjet ink having enhanced printhead jetting based on improved idle time and start up ability.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which tall within the limits of the appended claims.

What is claimed is:

1. An inkjet ink comprising:
   a carbon black pigment dispersion;
   a non-ionic silicone surfactant being about 0.1% to about 1.2% by weight of the inkjet ink;
   a polymeric dispersant being about 0.5% to about 1.5% by weight of the inkjet ink, the polymeric dispersant comprising a ter-polymer having moieties of methacrylic acid (MAA), poly(propylene glycol)-4-nonylphenyl ether acrylate (NPHPPG), and poly(ethylene glycol)2,4,6-tris-(1-phenylethyl)phenyl ether methacrylate (TRISA); and
   two or more humectants being about 20% to about 21% by weight of the inkjet ink and selected from the group consisting of 1,2-hexanediol; 1,3-propanediol; glycerol; and tri-ethylene glycol.

2. The inkjet ink according to claim 1, wherein the non-ionic silicone surfactant is a polyalkylene oxide polysiloxane having a dimethyl polysiloxane hydrophobic moiety and one or more hydrophilic polyalkylene side chains.

3. The inkjet ink according to claim 1, wherein the non-ionic silicone surfactant has a molecular weight of about 4000.

4. The inkjet ink according to claim 1, wherein the non-ionic silicone surfactant being about 0.5% to about 0.8% by weight of the inkjet ink.

5. The inkjet ink according to claim 1, wherein a molar ratio of MAA in the polymeric dispersant is about 15 parts to about 2 parts of a combination of NPHPPG and TRISA, and a molar ratio of TRISA in the polymeric dispersant is about 1 part to about 16 parts of a combination of NPHPPG and MAA.

6. The inkjet ink according to claim 1, further comprising a biocide and water.

7. A method of printing using an inkjet ink, the method being comprised of the steps of:
   positioning a print medium substantially adjacent to a printer having a print head retaining an inkjet ink, wherein the inkjet ink is comprised of
   a carbon black pigment dispersion;
   a non-ionic silicone surfactant being about 0.1% to about 1.2% by weight of the inkjet ink;
   a polymeric dispersant being about 0.5% to about 1.5% by weight of the inkjet ink, the polymeric dispersant comprising a ter-polymer having moieties of methacrylic acid (MAA), poly(propylene glycol)-4-nonylphenyl ether acrylate (NPHPPG), and poly(ethylene glycol)2,4,6-tris-(1-phenylethyl)phenyl ether methacrylate (TRISA); and
   two or more humectants being about 20% to about 21% by weight of the inkjet ink and selected from the group consisting of 1,2-hexanediol; 1,3-propanediol; glycerol; and tri-ethylene glycol; and
   jetting the inkjet ink from the print head onto the print medium as directed by the printer.

8. The method according to claim 7, wherein the non-ionic silicone surfactant is a polyalkylene oxide polysiloxane having a dimethyl polysiloxane hydrophobic moiety and one or more hydrophilic polyalkylene side chain.

9. The method according to claim 7, wherein the non-ionic silicone surfactant has a molecular weight of about 4000.

10. The method according to claim 7, wherein the non-ionic silicone surfactant being about 0.5% to about 0.8% by weight of the inkjet ink.

11. The method according to claim 7, wherein a molar ratio of MAA in the polymeric dispersant is about 15 parts to about 2 parts of a combination of NPHPPG and TRISA, and a molar ratio of TRISA in the polymeric dispersant is about 1 part to about 16 parts of a combination of NPHPPG and MAA.

12. The method according to claim 7, further comprising a biocide and water.

* * * * *